United States Patent [19]

Briggs et al.

[11] Patent Number: 5,138,680
[45] Date of Patent: Aug. 11, 1992

[54] OPTICAL FIBER CONNECTOR WITH ELASTOMERIC CENTERING AND FLOATING ALIGNMENT FEATURE

[75] Inventors: Robert C. Briggs, Newport; Bryan T. Edwards, Camp Hill; David D. Sonner, Harrisburg, all of Pa.

[73] Assignee: AMP Incorporated, Harrisburg, Pa.

[21] Appl. No.: 713,908

[22] Filed: Jun. 12, 1991

Related U.S. Application Data

[63] Continuation-in-part of Ser. No. 686,896, Apr. 17, 1991.

[51] Int. Cl.$^5$ .............................. G02B 6/26; H01J 5/16
[52] U.S. Cl. .................................. 385/90; 385/88; 385/92; 385/52; 250/227.11
[58] Field of Search ............... 350/96.20, 96.21, 96.22, 350/96.23; 250/227.11

[56] References Cited

U.S. PATENT DOCUMENTS

| | | | |
|---|---|---|---|
| 4,167,303 | 9/1979 | Bowen et al. | 350/96.21 |
| 4,236,787 | 12/1980 | Iacono et al. | 350/96.21 |
| 4,406,515 | 9/1983 | Roberts | 350/96.21 |
| 4,461,538 | 7/1984 | Breed et al. | 350/96.20 |
| 4,611,887 | 9/1986 | Glover et al. | 350/96.20 |
| 4,645,295 | 2/1987 | Pronovost | 350/96.20 |
| 4,736,100 | 4/1988 | Vastagh | 250/227 |
| 4,762,388 | 8/1988 | Tanaka et al. | 350/96.20 |
| 4,779,952 | 10/1988 | Hayashi et al. | 350/96.21 |
| 4,787,706 | 11/1988 | Cannon, Jr. et al. | 350/96.20 |
| 4,872,736 | 10/1989 | Myers et al. | 350/96.20 |
| 4,952,798 | 8/1990 | Graham et al. | 350/96.20 X |
| 4,960,317 | 10/1990 | Briggs et al. | 350/96.21 |
| 4,979,792 | 12/1990 | Weber et al. | 350/96.20 |
| 4,979,793 | 12/1990 | Bowen et al. | 350/96.20 |
| 5,016,968 | 5/1991 | Hammond et al. | 350/96.20 |

OTHER PUBLICATIONS

Optimate Catalog 88-812, AMP Incorporated, Mar. 1989, pp. 5-18.

Primary Examiner—Brian Healy
Attorney, Agent, or Firm—Gerald G. Kita

[57] ABSTRACT

A connector for joining light transmitting fiber cables through a cover (14) to a transmitter and/or receiver device (3) comprises a plug connector half (6) and a retention frame (48). The plug connector half (6) comprises a plug (8) having profiled passageway (43) for receiving an optical fiber, a transceiver adapter (10) adapted to axially receive the plug (8) through the cover (14) and extending forward axially (38) for aligning the plug (8) relative to the transmitter and/or receiver device (3). The retention frame (48) is mounted to the cover (14) and captivates the transceiver adapter (10) with play so as to permit free floating of the transceiver adapter (10) relative to the cover within the retention frame (48). The connector (7) is characterized by an elastomeric grommet body (64) interposed between the cover (14) and the captivated transceiver adapter (10). The body (64) substantially encompasses the outer perimeter of the adapter (10) and flexibly maintains the adapter (10) at a first specific orientation, but with reorientation capability, relative to the transmitter and/or receiver device (3).

13 Claims, 5 Drawing Sheets

OPTICAL FIBER CONNECTOR WITH ELASTOMERIC CENTERING AND FLOATING ALIGNMENT FEATURE FIELD OF THE INVENTION

This application is a continuation-in-part of Edwards et al. co-pending U.S. application Ser. No. 07/686,896 filed Apr. 17, 1991, Edwards II, pending. The present invention relates to an optical fiber connector with an self-centering feature for positioning, aligning, and guiding mating electrical or optical connector halves.

BACKGROUND OF THE INVENTION

It is standard practice with respect to mating connectors to provide means which position the connector halves so that the terminals therein are aligned for a proper mating engagement. It is common to provide pins, posts, and projections in one half made to fit within complementary apertures in the other half; both integrally molded with respect to the housings of the connector halves, or added as hardware. One problem associated with interconnecting of connector halves arises when the halves are of different suppliers and are not complementary. In such instances it is necessary to provide an adapter that alters one or both of the connector halves so as to permit interconnection. A particular instance of such problem involves the replacement, within a computer bulkhead, of a circuit board-mounted transceiver of one manufacturer with a circuit board-mounted transceiver of another manufacturer. In such instance the replacement board may be characterized by receiver and transmitter ports of alignment differing from the alignment of the ports of the transceiver board which has been replaced. Precise connection between the transceiver ports with a connector through the backplane of the computer bulkhead may be impossible if, indeed, connection may be made at all.

Edwards I addresses the problem of the differing fit of circuit boards, and generally the problem of precise fit between connector halves by providing a connector half with a latching beam mechanism feature for positioning, aligning and guiding mating connector halves and for providing improved retention between the resulting, mated halves.

During interconnection, connector halves must approach one another within the connection envelope which is the area through which each half must pass so as to accomplish fit of one half to the other. The envelope may be enlarged to accommodate a greater area of misalignment by the utilization of certain mechanisms such as the complementary beveled latching beams and aperture surfaces of the clip of Edwards I, wherein the beveled surfaces permit the guiding of the beam heads from a misaligned juxtaposition to an entry into the corresponding accepting apertures of the clip connector half.

Edwards II relates to a connector for joining light transmitting fiber cables through a cover to a transmitter and/or receiver device wherein the connector is characterized by a floating alignment feature that permits realignment of a plug connector half so as to accommodate a misaligned connector half during intermating. The float feature is provided by a retention frame mounted to the cover to captivate the transceiver adapter of the plug connector half with play of the adapter within the frame so as to permit free floating of the transceiver adapter relative to the cover within the retention frame.

It would be advantageous to position the transceiver adapter of Edwards II within the spacing of the float so as to accommodate that portion of the window of connection through which an approaching complementary connector half is most likely to pass. Further it would be advantageous to maintain the position of the transceiver adapter in a particular aspect regardless of the orientation of the cover and connector half. For example, it would be advantageous to maintain the transceiver adapter through the cover in a vertical orientation as well as a horizontal orientation.

The present invention relates to an alignment and centering feature for connector halves which feature may be used in conjunction with the floating alignment feature disclosed and claimed by Edwards II. The present invention is particularly applicable in instances where the misalignment of a mating board is such that the beveled faces of aligning pins or latch beams are unable to come into contact with complementary beveled faces of the apertures of the clip connector half because they are outside or positioned at the extremities of the connection envelope. Further the present invention allows for both horizontal and vertical mounting of connector halves as, for example, where one connector half is attached to a circuit board.

It is an object of the present invention to provide a connector with a centered floating alignment feature that permits interconnection between connector halves of a variety and range of types. It is particularly an object of the present invention to provide an improved connection between a board mounted transmitter and/or receiver and a shrouded plug connector, as for example, a connection between a Fiber Distributed Data Interface (FDDI) and a connector of the Fixed Shroud Duplex (FSD) type.

SUMMARY OF THE INVENTION

The present invention relates to a connector for joining light transmitting fiber cables through a cover to a transmitter and/or receiver device. The connector is characterized by a floating alignment feature and centering feature comprising an elastomeric grommet body. The connector comprises a plug connector half comprising a plug having an axially extending bore for receiving an optical fiber, and a transceiver adapter adapted to axially receive the plug through the cover. The transceiver adapter extends forward axially for aligning the plug relative to the transmitter and/or receiver device. A retention frame is mounted to the cover and captivates the transceiver adapter with play so as to permit free floating of the transceiver adapter relative to the cover within the retention frame.

The elastomeric grommet body is interposed between the cover and the captivated transceiver adapter. The body encompasses the outer perimeter of the adapter and flexibly maintains the adapter at a first specific orientation, but with reorientation capability, relative to the transmitter and/or receiver device. The elastomeric grommet body comprises an elastomeric frame rectangular in shape and having a center window accommodating the adapter with the frame encompassing the outer perimeter of the adapter. The grommet body may be characterized by a plurality of perforations evenly spaced along the frame of the body, with collapse of the perforations permitting relative adjustment of sections of the frame so as to permit free floating of the transceiver adapter relative to the cover within the grommet body. The body may be of an elastomeric material of any of thermosetting polymers, thermoplastic polymers and natural rubbers including foam polymers and rubbers.

The cover may comprise a panel having a window and a cover plate attached to the panel having window coextensive with the window of the panel. The transceiver adapter is aligned with and is fitted therethrough the coextending windows, from one side of the cover to another side of the cover, so as to axially receive the plug through the panel and the cover plate. In this embodiment, the grommet body is interposed between the cover plate with the body window coextensive with the window of the panel. The transceiver adapter is aligned with and is fitted therethrough the coextending windows, from one side of the cover to another side of the cover, so as to axially receive the plug through the panel and cover plate.

The transceiver adapter may be an integral two-part structure comprising a transceiver shroud adapted to axially receive the plug and extending axially for aligning the plug relative to the transmitter and/or receiver device, and further having forward mating face, and further comprising a latching beam mechanism having forward extending latching beams.

Further the connector may comprise a clip connector half attached to and integral with the transmitter/receiver device and having apertures therein beveled to receive the latching beams. Each of the latching beams has beveled forward end for interacting with the respective beveled aperture of the clip connector half to align the beam to the opening upon mating of the plug connector half to the clip connector half. Each of the latching beams has a port toward its forward end. The clip connector half further comprises clip retention window coextensive with each aperture through a port common to both the retention window and the aperture. The clip connector half further comprises a clip with a dimple adapted to clip within each of the retention windows. The dimple is biased through the port in the window and into engagement with the latching beam through the port of the beam upon mating of the plug connector half to the clip connector half.

The transmitter and/or receiver device may have mounts projecting therefrom for connecting each transmitter and/or receiver to a respective optical fiber cable which extend forward within the axial bore of the plug. Each mount has a square base which forms flanges. The clip connector half further comprises a face with arc-shaped openings for clip fit to the flanges of the mounts of the transmission and/or receiver device.

DESCRIPTION OF A PREFERRED EMBODIMENT

Figure 1:
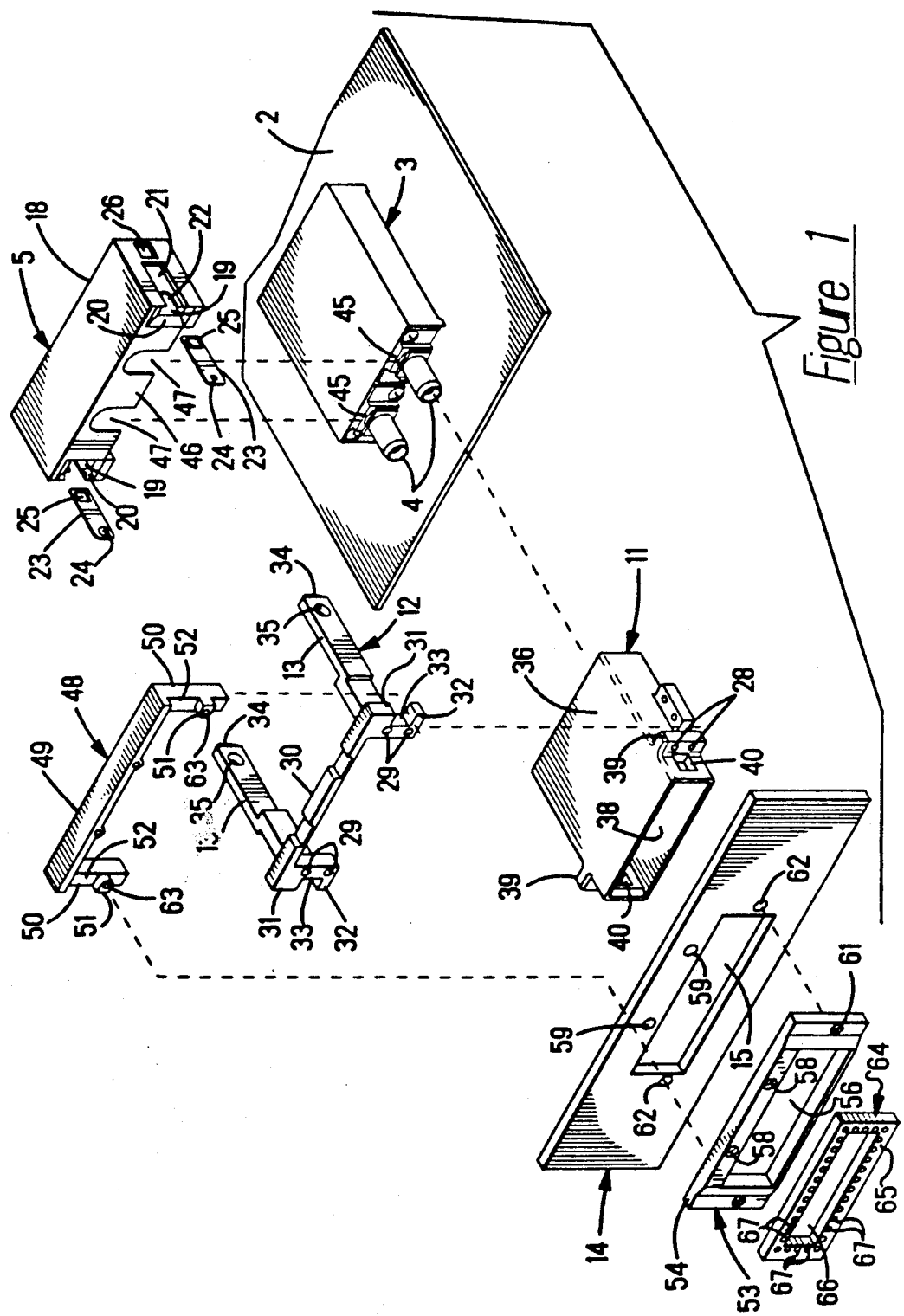
FIG. 1 is a perspective view, partially exploded, of the connector of the present invention along with a cover and transmitter and/or receiver device.
Figure 2:
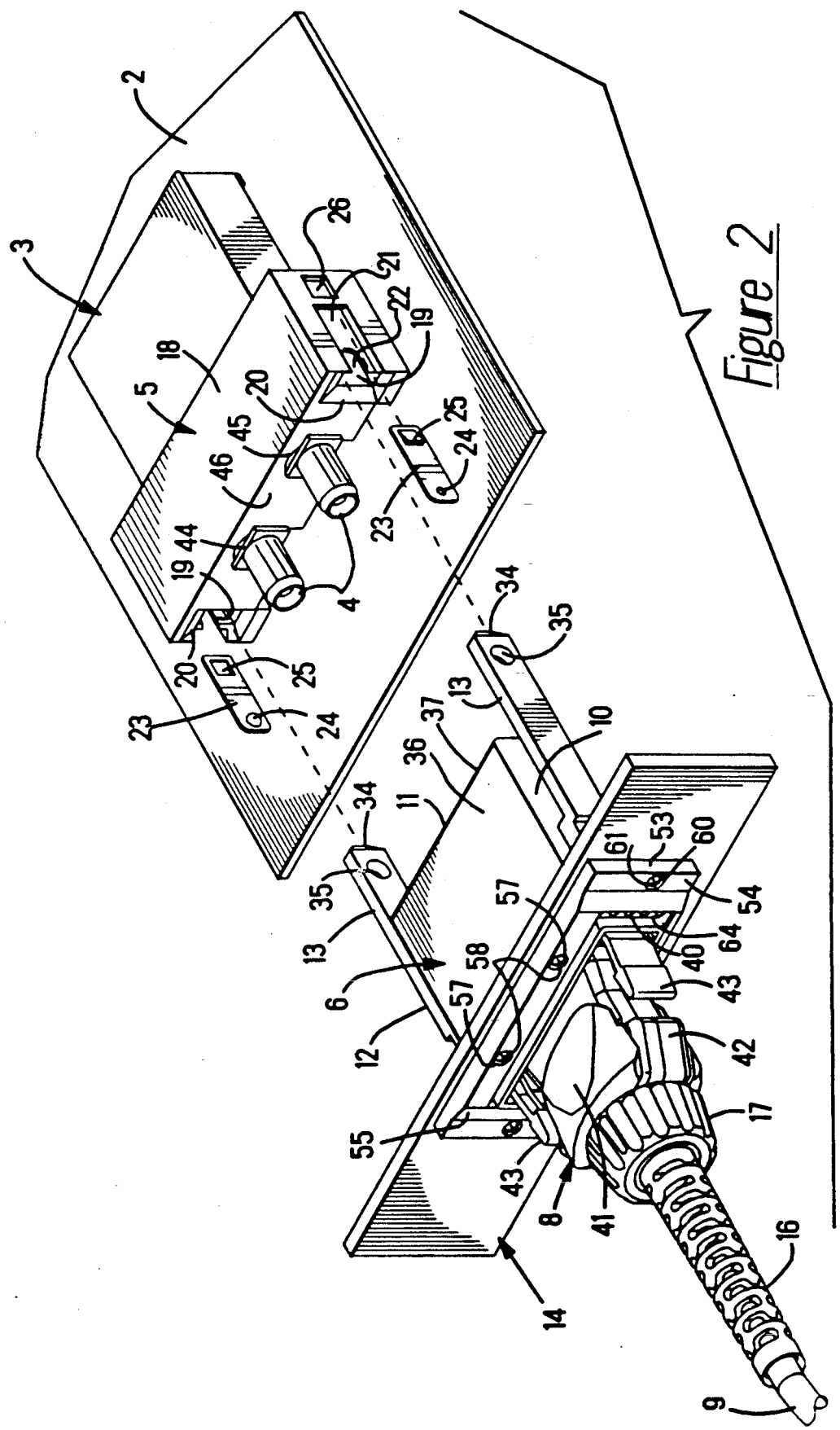
FIG. 2 is a perspective view showing connector halves preparatory to mating, along with associated mounting structures.
Figure 3:
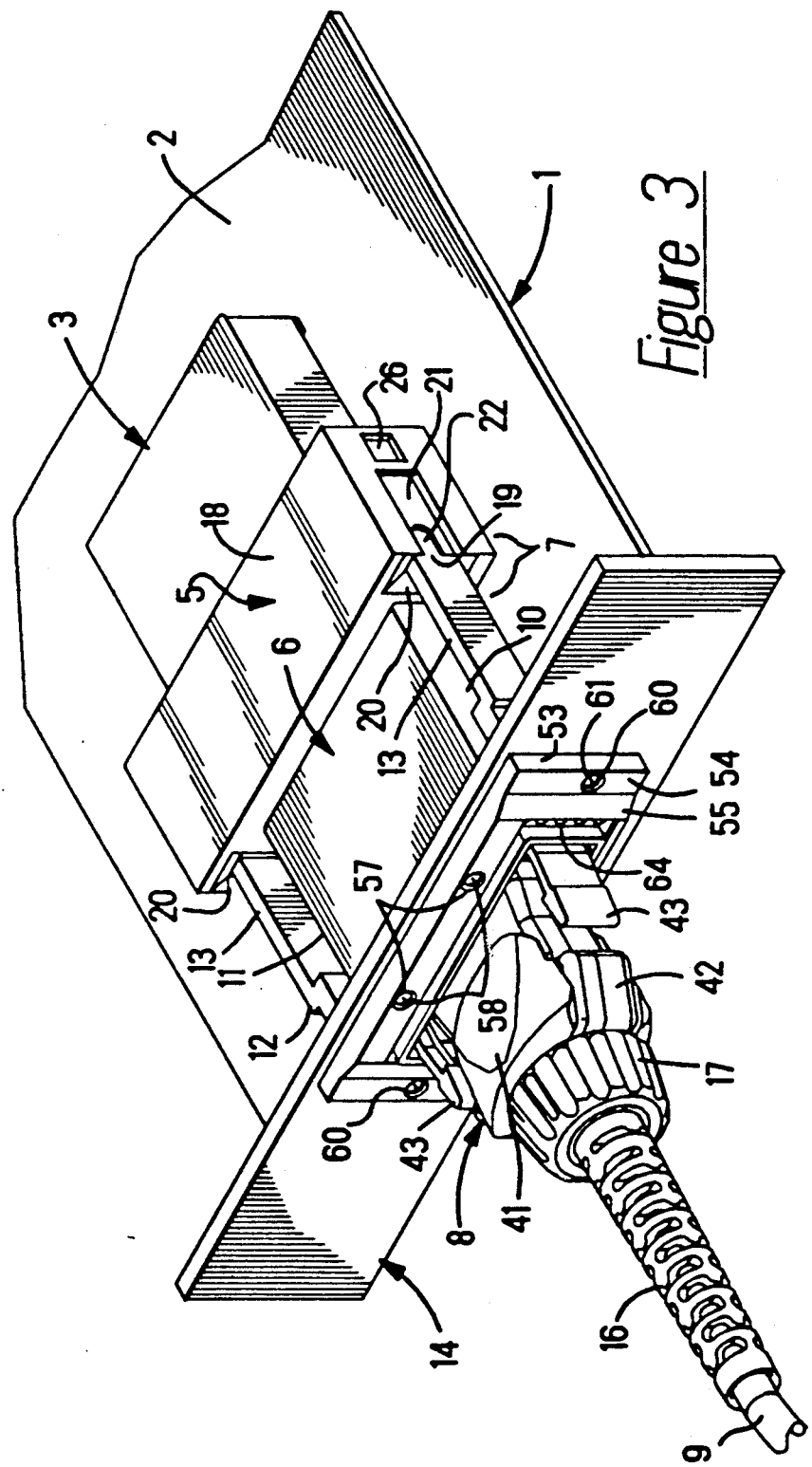
FIG. 3 is a perspective view showing mated connector halves along with associated mounting structures.

Referring to FIGS. 1, 2 and 3, an electronic package 1 is shown to include a mounting structure 2 which may be a printed circuit board carrying circuit traces to electronic components such as logic and memory devices. Mounted on structure 2 is a transmitter/receiver device 3 which includes a pair of signal ports 4 suitably interconnected to components which convert electrical to optical and optical to electrical signals, i.e. transmitters and receivers. Shown also, is clip connector 5 which is a connector half, and which with plug half structure 6 comprises the connector 7 of the present invention as hereinafter described.

Half structure 6 includes plug 8 terminating a cable 9 to a forward portion, and transceiver adapter 10. Transceiver adapter 10 is shown as a two part structure comprising a transceiver shroud 11 and latching beam mechanism 12. Transceiver shroud 11 is adapted to axially receive plug 8. The shroud 11 extends forward axially for aligning the plug relative to the transmitter/receiver device 3. The latching beam mechanism 12 has latching beams 13 extending therefrom. The connector half 6 is mounted, as indicated, in a mounting structure which may be considered, in the embodiment here involved, as a panel front or cover 14 which encloses the interconnection when the connector halves 5, 6 are mated through window 15 of the panel front 14.

In FIGS. 2 and 3, the plug connector half 6 further comprises strain relief means 16 which is a tubular member with integral means for distributing bending substantially along its length. The plug 8 has a threaded end (not shown). Cap 17 has a threaded bore complementary to the end of the plug 8, and has a bore of decreased opening for capturing the strain relief 16 when the cap 17 is inter-engaged with the threaded end of the plug 8.

Shown in FIGS. 1, 2 and 3, clip connector half 5 comprises a cover body 18 having apertures 19 which are beveled 20 to receive latching beams 13 which, upon connection, are guided into the apertures 19 by the beveling 20. Clip connector half 5 further comprises clip retention slot 21 coextensive with each of apertures 19 through cut-out 22 common to both the retention slot 21 and the aperture 19, and further comprises clips 23 each with dimple 24. Each clip 23 has wing 25 which is a portion of the clip 23 biased upward to form the said wing 25 with function as hereinafter described. The clips 23 are adapted to fit within respective retention slot 21 with dimple 24 biased through respective cut-out 22 in the slot 21 and wing 25 providing retention by snap fit within a window 26 which is a continuation of slot 21 beneath the cover body 18 of the connector half 5.

Figure 4:
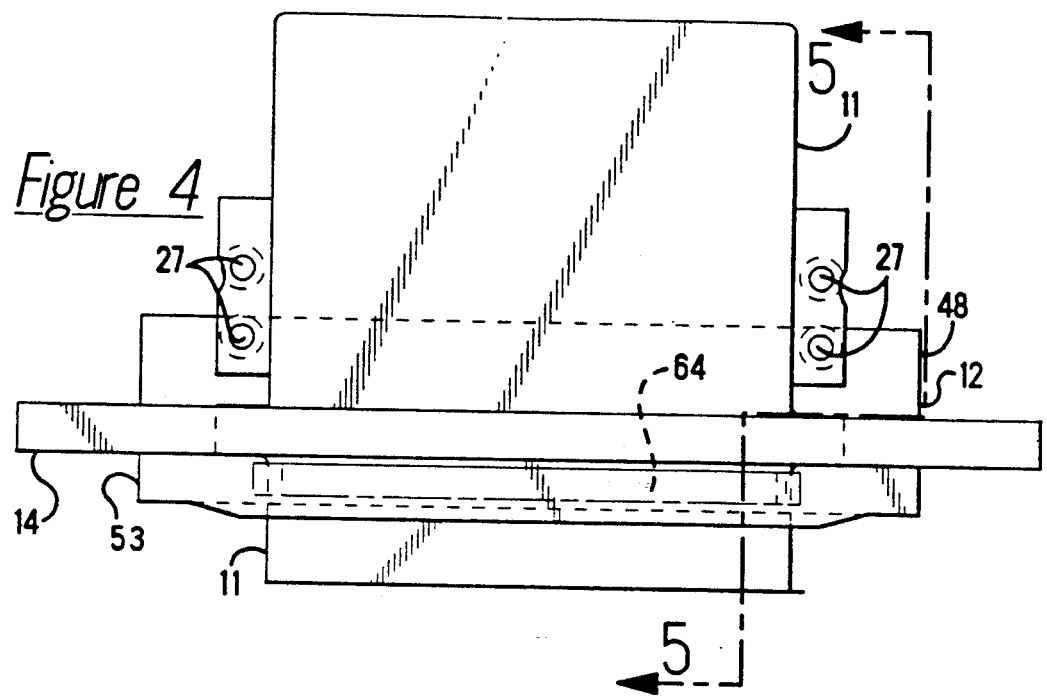
FIG. 4 is a top view of the interconnection of the connector adapter through panel and cover plate showing, in phantom, the elastomeric grommet body of the present invention.
Figure 5:
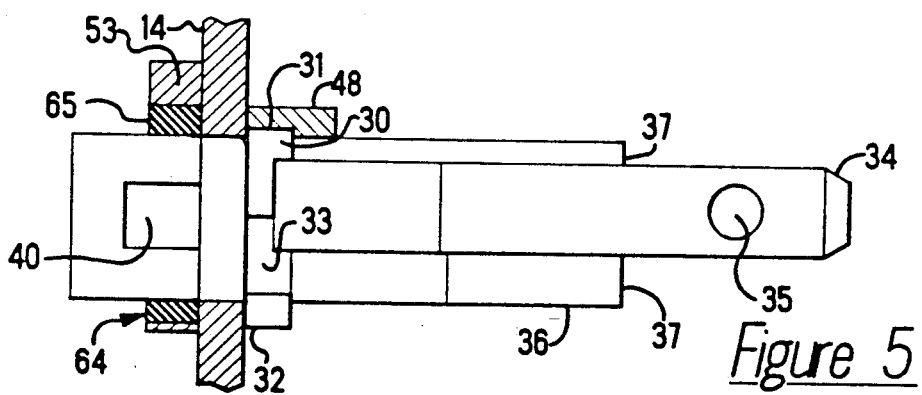
FIG. 5 is a cut away side elevation through 5-5 of FIG. 4 showing shroud, latch beam mechanism and grommet body.

The transceiver adapter 10 may be a molded integral structure characterized by a transceiver shroud portion 11 and latching beam mechanism portion 12 or the adapter 10 may be a two part structure, as shown in the FIGS. 1 and 2, comprising a transceiver shroud part 11 and a latching beam mechanism 12 secured together with an inter-engaging means to form said integral two part structure-the transceiver adapter 10. The interengaging means may be bolts 27 (see FIG. 4) through the commonly aligned holes 28 of the transceiver shroud 11 and holes 29 of the latching beam mechanism 12. Notable is that the transceiver adapter 10 is located within the cover 14 and receives the plug 8 through window 15 to within the cover 14 enclosure. By fixing the location of the adapter 14 within the enclosure, the position of the transceiver 3 is set. If the adapter 10 were positioned outside of the enclosure then location of the transceiver 3 would be dependant upon the thickness of the cover 14. Changing between different covers 14 of different thicknesses would otherwise require relocation of the mounting of the transceiver 3 and clip connector half 5 within the enclosure. This problem is eliminated with the positioning of the adapter 10 in accord with the present invention.

Referring to FIGS. 1, 2, 3 and 5, latching beam mechanism 12 is in the form of a main body 30 having latching beams 13 extending therefrom and side extending flanges, both upper 31 and lower 32, which define a gap 33 with utility as hereinafter described. Each latching beam 13 is a beam shaped body with forward beveled face 34 and port 35. When interconnected to form transceiver adapter 10, the main body 30 of the latching beam mechanism 12 straddles shroud 11 with interengaging holes 28 aligned with holes 29 of the shroud 11 as aforesaid.

Transceiver shroud 11 consists of a body 36 having forward mating face 37, axial cavity 38 to receive the plug 8, extending flanges 39 with holes 29 and latch ports 40 to both sides of body 36.

With reference to FIGS. 1 and 3, Plug 8 is constructed for disconnect coupling through means of transceiver adapter 10 and is a hollow body of molded upper cover 41 and molded lower cover 42. The covers 41, 42 are of insulated plastic material formed by molding into a shape that has an exterior with dimensions that intermate with the transmitter/receiver via transceiver adapter 10. Upper cover 41 and lower cover 42 are complementarily contoured in their interiors so as to form a profiled passageway having optical cables disposed therein. Upper cover 41 intermates with lower cover 42 by snap-in connection. Threaded cap 17 secures the upper cover 41 together with the lower cover 42 to encompass and provide an enclosure for the optical fibers of optical cable 9. The plug 8 is secured within the transceiver adapter 10 by biased fit of latches 43 through latch ports 40.

Further shown in FIGS. 1, 2 and 3 is transmitter/receiver device 3 and clip connector half 5. Transmitter/receiver ports 4 have square bases which form flanges 44 and 45. Clip connector half 5 is formed of cover body 18 having mating face 46 characterized by openings 47 which form lips that snap fit onto flanges 45.

With reference to FIGS. 1, 2 and 3, during connection of plug connector half 6 with clip connector half 5, the apertures 19 of clip connector half 5 receive respective latching beams 13 of plug connector half 6 with each bevel 20 interacting with the respective beveled face 34 of each latching beam 13 to guide each latching beam 13 into a respective receiving aperture 19. Simultaneously, transceiver/receiver device 3 passes into axial cavity 38 of transceiver shroud 11 thereby connecting the transmitter and/or receiver 3 to a respective optical fiber disposed within the transceiver shroud 11.

With reference to FIGS. 1, 2, 3, 4 and 5, and FIGS. 6A, 6B, 6C and 6D, shown is the floating fit of the transceiver adapter 10 which permits alignment to transmitter/receiver device 3 and to clip connector half 5 even in circumstances where these elements may be misaligned thus prohibiting proper mating with prior art transceiver adapters 10 and associated mountings. By the present invention, is provided a retention frame 48 with main body 49 and extending arms 50 each with rearward extending pedestals 51 which, with rearward extending main body 49 define gaps 52. Retention frame 48 is adapted to straddle transceiver adapter 10 and be immobilized by a secure connection to cover 14 which is provided by an interconnection to cover plate 53. Cover plate 53 has two sections, a relatively flat section 54, the bottom of which fits flush to cover 14, and an outcrop section 55 that rises from the plane of the flat section 54 and which defines cover plate window 56. Cover plate 53 is secured to cover 14 by bolts 57 or the like through holes 58 of cover plate 53 and holes 59 of cover 14. The interconnection means between retention frame 48 and plate 53 may be a bolt 60 or the like through commonly aligned holes 61 of cover plate 53, holes 62 of cover 14 and holes 63 of retention frame 48.

With the straddling of retention frame 48 over transceiver adapter 10, and the interconnection of the frame 48 to cover 14 and to plate 53, pedestals 51 fit within respective gaps 33 of latching beam mechanism 12.

Each gap 52 of retention frame 48 is particularly defined by main body 49 and pedestal 51 so as to loosely accommodate respective flange 31 of latching beam mechanism 12, and gap 33 of latching mechanism 12 is particularly defined by respective upper 31 and lower 32 flanges so as to loosely accommodate respective pedestal 51 of frame 48 whereby transceiver adapter 10 is captivated by retention frame 48 but in such a manner as to permit vertical movement of the adapter 10 within the frame 48 and relative to the cover 14. Further, the spacing between the pedestals 51 exceeds the distance between the gaps 33 so that the transceiver adapter 10 is permitted horizontal movement as well.

FIGS. 4, 5, 6A, 6B, 6C and 6D show the connection among the retention frame 48, panel front 14 and cover plate 53, the connection of the transceiver shroud 11 and latch beam mechanism 12 and the floating fit of shroud 11 and latch beam mechanism 12 within the combination of retention frame 48, panel front 14 and cover plate 53, while FIGS. 6A, 6B, 6C and 6D further illustrate the floating of the transceiver adapter within the fixed structure which is the combination of the retention frame 48, the panel front 14 and the cover plate 53.

Shown in all Figures is the elastomeric grommet body 64 which provides the floating alignment feature and centering feature of the connector of the present invention. The elastomeric grommet body 64 is shown interposed between cover plate 53 and the captivated transceiver adapter 10. The grommet body 64 substantially encompasses the outer perimeter of the adapter 10 and flexibly maintains the adapter 10 at a first specific orientation, but with reorientation capability, relative to the transmitter and/or receiver device 3. The elastomeric grommet body 64 comprises an elastomeric frame 64 rectangular in shape and having a center window 66 accommodating the adapter 10 with the frame 65 encompassing the outer perimeter of the adapter 10. The grommet body 64 is characterized by a plurality of perforations 67 evenly spaced along the frame 65 of the body 64. The flexibility of the body 64 and the collapsibility of the perforations 67 permits a relative adjustment of a plug connector half 6 to a connecting clip connector half 5. The grommet body 64 permits the plug connector half 6 to freely float relative to the cover 14 within the retention frame 48 while, at the same time the grommet body 64 provides a static orientation of the plug connector half 6 to permit vertical as well as horizontal mounting and to accommodate the most probable window of connection with the transceiver/receiver device 3.

Figure 6A:
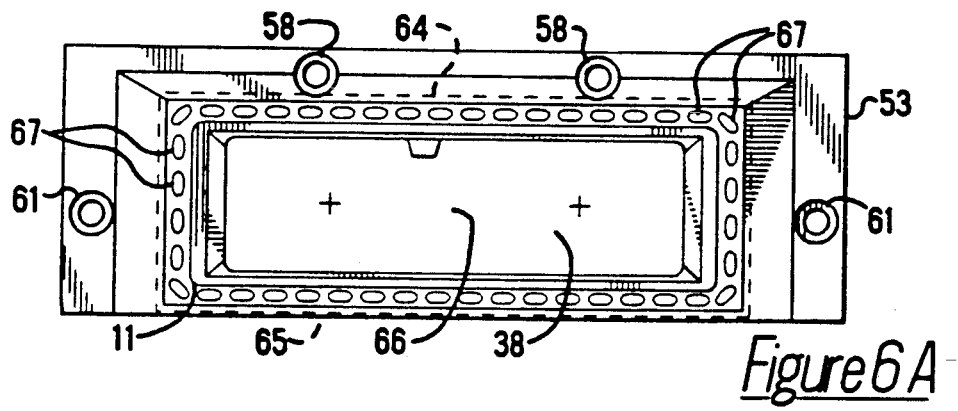
FIGS. 6A, 6B, 6C and 6D are elevation views from a rear position showing the panel and elastomeric grommet body.
Figure 6B:
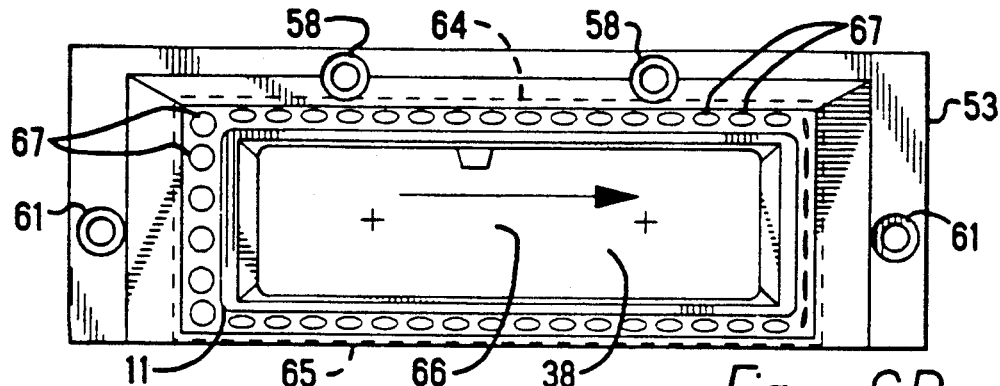
Figure 6C:
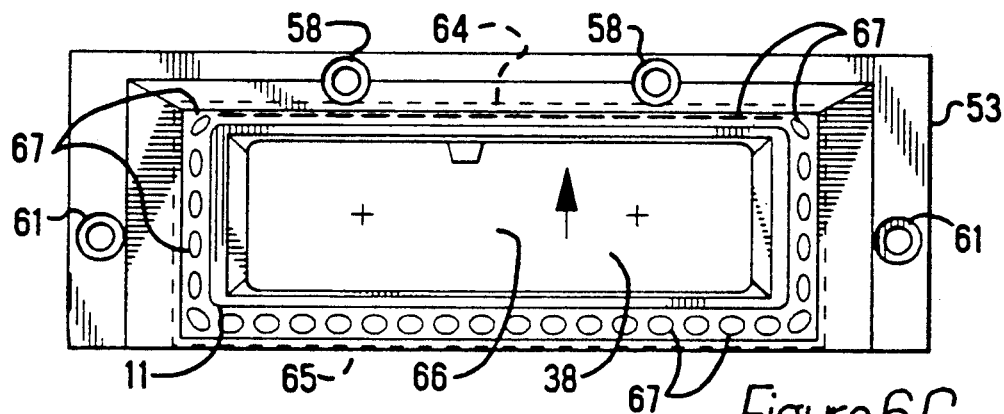
Figure 6D:
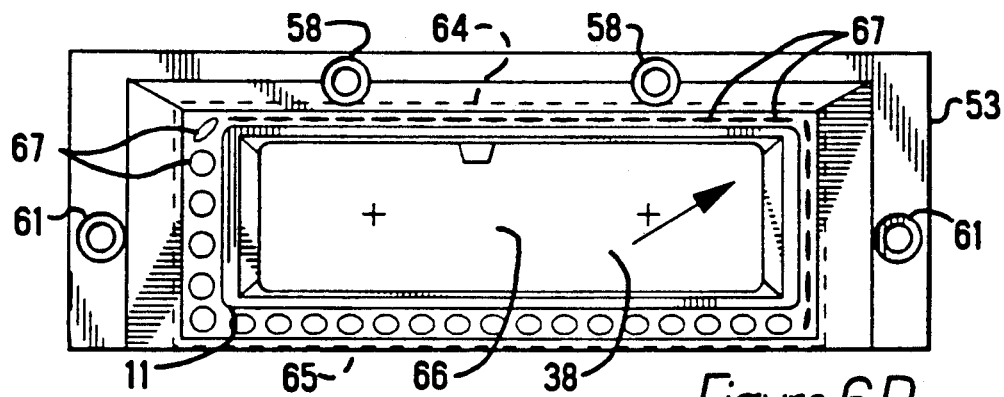

FIGS. 6A, 6B, 6C and 6D show the accommodation of the loaded and floatable, but centered, plug connector half 6 during connection with a misaligned transmitter/receiver device 3. FIG. 6A shows the combined structures of the elastomeric grommet body 64, retention frame 48, panel front 14 and cover plate 53 maintaining plug 8 in a neutral static orientation. Correspondingly, FIG. 6B shows the float upward of the plug 8 and transceiver adapter 10 against the grommet body 64 which collapses perforations 67 to one side of frame 65 thereby compressing the grommet 64; FIG. 6C shows floating to the right and FIG. 8D, floating upward and to the right.

With alignment of the half structure 6 to clip connector half 5, latching beams 13 are able to approach respective clip retention windows 21 with beveled face 34 of each beam contacting bevelinq of respective clip retention window 21. The beveling 20 of the retention window 21 leads the beam into aperture 19. As mating takes place the floating of the transceiver adapter 10 and plug 8 permits adjustment of the alignment of the beam 13 to the aperture 19 along the face of beveling 20. At the same time, the floating feature permits alignment of signal ports 4 of the transmitter/receiver device 3 to respective optical fibers disposed by ferrules (not shown) within plug 8. As the beam 13 progresses within aperture 19, beveled face 30 contacts dimple 24 of clip 23. Beveled face 34 imposes against dimple 24, which is biased into aperture 19 through port 22. Beveled face 34 pushes dimple 24 against the bias and to without the port 22 permitting beam 13 to progress up aperture 19. Dimple 24 snaps back into aperture 19 and into seat within port 35 of the latching beam 13, as port 35 becomes aligned with the port 22. The snap fit of the dimple 24 into port 35 retains the beam 13 within the aperture 19 of the clip half 5 with a predetermined retention force.

While what has been described constitutes a presently preferred embodiment of the invention, it should be recognized that the connector 7 of the present invention may take other forms so long as it is characterized by the elastomeric grommet body 64 interposed between cover 14 or cover plate 53 and the captivated transceiver adapter 10. Accordingly, it should be understood that the invention is to be limited only insofar as required by the scope of the following claims.

We claim:

1. A connector for joining light transmitting fiber cables through a cover to a transmitter and/or receiver device comprising:
   a plug connector half comprising; a plug having axial extending bore for receiving an optical fiber; a transceiver adapter adapted to axially receive said plug through said cover and extending axially forward for aligning said plug relative to said transmitter and/or receiver device; and retention frame mounted to said cover and captivating said transceiver adapter with play of said adapter within said frame so as to permit free floating of said transceiver adapter relative to said cover within said retention frame;
   wherein the said connector further comprises an elastomeric grommet body interposed between said cover and said captivated transceiver adapter, the body encompassing the outer perimeter of the adapter and flexibly maintaining the adapter at a first specific orientation, but with reorientation capability, relative to said transmitter and/or receiver device.

2. The connector of claim 1 wherein said cover comprises a panel having a window and a cover plate attached to said panel having window coextending with the said window of said panel, and wherein said transceiver adapter is aligned with and is fitted therethrough said coextensive windows, from one side of said cover to another side of said cover, so as to axially receive said plug through said panel and said cover plate.

3. The connector of claim 2 wherein said grommet body comprises an elastomeric frame interspaced between said cover plate and said captivated transceiver adapter.

4. The connector of claim 3 wherein said grommet body comprises an elastomeric frame rectangular in shape and having center window accommodating the adapter with said frame encompassing the outer perimeter of the said adapter.

5. The connector of claim 4 wherein said grommet body is characterized by a plurality of perforations evenly spaced along the said frame of the body, with collapse of the perforations permitting relative adjustment of sections of the frame so as to permit free floating of said transceiver adapter relative to said cover within said grommet body.

6. The connector of claim 1, claim 3 or claim 5 wherein said transceiver adapter is an integral two-part structure comprising; a transceiver shroud adapted to axially receive said plug and extending forward axially for aligning said plug relative to said transmitter and/or receiver device; and latching beam mechanism having forward extending latching beams.

7. The connector of claim 6 wherein said latching beam mechanism comprises main body straddling said shroud and secured thereto and having latching beams extending therefrom and side extending flanges which define a gap.

8. The connector of claim 7 wherein each latching beam of said latching beam mechanism is a beam shaped body with forward beveled face and port.

9. The connector of claim 8 further comprising clip connector half attached to and integral with said transmitter/receiver device and having aperture therein beveled to receive said latching beam.

10. The connector of claim 9 wherein each of said latching beams has beveled forward end for interacting with the said beveled aperture of said clip connector half to align said beams to said opening upon mating of said plug connector half to said clip connector half, and wherein each of said latching beams has port toward said forward end.

11. The connector of claim 10 wherein said clip connector half further comprises clip retention window coextensive to each of said aperture through port common to both said retention window and said aperture, and further comprises clip with dimple adapted to clip within said retention window with said dimple biased through said port in said window and into engagement with said latching beam through said port of said beam upon mating of said plug half connector to said clip connector half.

12. The connector of claim 11 wherein said transceiver shroud and said latching beam mechanism are secured together with inter-engaging means to form said integral two part structure.

13. The connector of claim 12 wherein said transceiver shroud and said latching beam mechanism is a molded integral structure characterized by a transceiver shroud portion and a latching beam mechanism portion.

* * * * *